United States Patent [19]

Bell

[11] 4,206,608
[45] Jun. 10, 1980

[54] NATURAL ENERGY CONVERSION, STORAGE AND ELECTRICITY GENERATION SYSTEM

[76] Inventor: Thomas J. Bell, 1585 Bay Point Dr., Sarasota, Fla. 33577

[21] Appl. No.: 917,737

[22] Filed: Jun. 21, 1978

[51] Int. Cl.² .................. F01B 23/08; F01B 23/10
[52] U.S. Cl. ............................. 60/698; 60/641; 60/398; 290/4 R; 290/55
[58] Field of Search ............ 60/325, 398, 641, 698, 60/652, 659; 290/1 R, 44, 55, 4 R

[56] References Cited

U.S. PATENT DOCUMENTS

| | | | |
|---|---|---|---|
| 3,996,741 | 12/1976 | Herberg | 60/398 |
| 4,031,702 | 6/1977 | Burnett et al. | 60/398 |
| 4,079,591 | 3/1978 | Derby et al. | 60/659 X |
| 4,118,637 | 10/1978 | Tackett | 60/398 X |

FOREIGN PATENT DOCUMENTS

2444978  4/1975  Fed. Rep. of Germany ............. 60/698

*Primary Examiner*—Allen M. Ostrager
*Assistant Examiner*—Stephen F. Husar
*Attorney, Agent, or Firm*—Burns, Doane, Swecker & Mathis

[57] ABSTRACT

An apparatus and method for utilizing natural energy in the production of electricity having an alternating current is disclosed wherein the natural energy is utilized to pressurize hydraulic fluid. The hydraulic fluid is temporarily stored within high pressure storage tanks to be utilized in the production of electricity. This electricity is supplied as needed to various consumers. Excess electricity which is generated by hydro electric devices driven by the pressurized hydraulic fluid is utilized to pressurize additional hydraulic fluid. The additional hydraulic fluid is then supplied to the high pressure storage tanks to be used at a later time for the production of electricity. In this way, excess electricity that is produced from the pressurized hydraulic fluid is reconverted into pressurized hydraulic fluid which may be stored in the high pressure storage tanks until needed. The high pressure storage tanks may be initially charged with a compressible fluid which is compressed by the pressurized hydraulic fluid. A piston may be provided within each storage tank in order to separate the pressurized hydraulic fluid from the compressible fluid. Depending upon the overall capacity of the natural energy system, a plurality of pressurized storage tanks may be necessary and may be conveniently provided underground.

17 Claims, 12 Drawing Figures

NATURAL ENERGY CONVERSION, STORAGE AND ELECTRICITY GENERATION SYSTEM

BACKGROUND OF THE PRESENT INVENTION

Natural energy is abundantly available throughout the world in various forms such as natural wind, solar, tidal and wave energy. Heretofore, it has not been feasible to utilize large quantities of natural energy in the production of electricity having an alternating current except in somewhat specific circumstances. For example, windmills have been used for the production of electricity although such use has typically been limited to the production of small amounts of electricity. Water energy including both tidal and wave energy has been used in the production of electricity but once again such use has not been shown to be economically feasible on a large scale. Finally, electricity has been produced directly from natural solar energy although once again such a production of electricity is not yet economically feasible on a grand scale.

Conventional sources of energy for the production of electricity such as oil, gas, coal and wood are in an ever dwindling supply which necessitates that natural forms of energy be utilized to a greater extent. The natural forms of energy are effectively inexhaustable and are typically available in one form or another throughout the world.

Unfortunately, both the average and peak demands for electrical energy in homes and in industry are typically out of phase with the availability of natural sources of energy. For example, tidal and wave action, although somewhat predictable does not oftentimes coincide with the times at which peak electrical energy is required. Similarly, solar energy is most abundant typically during the middle of the day with the peak demand for electrical energy, however, oftentimes occuring later in the evening and gradually decreasing thereafter. Accordingly, it is necessary that the natural energy be somehow stored so as to be releasable during those periods of average and peak demand as required.

Perhaps the most common method of storing electrical energy is with batteries. Large storage batteries have been developed on a commercial basis and have been used both on farms and in industry. Electrical storage batteries, however, are objectionable due to problems relating to maintenance and reliability. Furthermore, electrical storage batteries are limited to providing electrical energy having a direct current. Such DC electricity is not compatable with the vast majority of conventional appliances and motors. Accordingly, a need exists for a dependable and economical method and apparatus for storing natural energy, preferably in a manner by which the natural energy can be converted to AC electricity.

Various systems are known for utilizing natural energy to produce energy in a usable form such as for example electrical energy or mechanical energy. Furthermore, an arrangement is known wherein wind, water movement and/or sunlight are used to drive hydraulic pumps for the pressurization of a hydraulic fluid. In the arrangement, the hydraulic fluid is supplied to a cylindrical tank having a weighted piston. The hydraulic fluid is withdrawn from the tank by way of a pressure and flow regulator to drive a hydraulic motor. Such an arrangement is described in U.S. Pat. No. 4,031,702 issued to Burnett et al on June 28, 1977.

Natural energy conversion systems such as are disclosed in the Burnett et al patent have objectionable characteristics and limitations, however, resulting particularly from the use of a weighted piston storage tank. Weighted piston storage tank systems are somewhat impractical because the weighted piston must be very heavy and bulky in order to provide the necessary pressurization. Furthermore, the use of weighted pistons requires that the storage tank be oriented in a generally vertical manner. The vertical orientation is necessary in order to make use of the force of gravity on the weighted piston.

Another system for converting one form of natural energy into usable electricity utilizes an elevated reservoir for the storage of excess energy and is disclosed in U.S. Pat. No. 4,010,614 issued to Arthur on Mar. 8, 1977. In the system of the Arthur patent, a solar collector produces steam to drive an electrical generator and a hydraulic pump. When the demand for electrical energy is below the capacity of the generator, the excess energy is used to drive the hydraulic pump. Water is transported by the hydraulic pump from a low level reservoir to the elevated reservoir to thereby store potential energy. When demand has increased beyond the capacity of the generator or when the supply of solar energy is decreased sufficiently, water from the elevated reservoir is used to drive a second electrical generator.

The system of the Arthur patent, however, is not readily usable in many situations since an elevated reservoir for storing water is necessary. In order to drive an electrical generator of a commercial capacity, the elevated reservoir for water must have a particular minimum elevation and must furthermore have a storage capacity of a rather large amount.

The present invention overcomes these and other problems of the prior art in that the natural energy conversion system utilizes a plurality of natural energy sources for the pressurization of hydraulic fluid. A plurality of natural energy sources are used so that periodic and intermittent fluctuations in the supply of natural energy of one particular form may be compensated for by the other forms of natural energy. The pressurized hydraulic fluid is supplied to at least one high pressure storage tank wherein a compressible fluid is compressed by the pressurized hydraulic fluid. Electrical energy is produced by the pressurized hydraulic fluid and is supplied as needed to various consumers. Excess electricity which is not needed by consumers is supplied to an electric motor which drives a hydraulic pump. The excess energy is thereby utilized to pressurize hydraulic fluid which is supplied to the high pressure storage tanks. In this way, excess energy is conserved and is not wasted needlessly.

Accordingly, it is an object of the present invention to provide a natural energy conversion system utilizing various forms of natural energy for the production of electricity.

Another object of the present invention is to provide a system for the production of alternating current electricity by a utilization of various forms of natural energy to pressurize a hydraulic fluid.

Still another object of the present invention is to provide a system for the utilization of natural energy for the production of AC electricity wherein the natural energy is utilized to pressurize a hydraulic fluid that is stored in a pressurized storage tank by compressing a compressible fluid.

The apparatus of the present invention includes a plurality of devices for converting natural energy such as natural wind, solar, wave and tide energy to pressurize a hydraulic fluid. The hydraulic fluid is supplied to the various devices from a supply tank which is preferably at a low pressure, for example, atmospheric pressure. The pressurized hydraulic fluid is supplied to one or more high pressure storage tanks through a hydraulic energy junction. The high pressure storage tanks supply pressurized fluid preferably at a substantially constant rate to a hydraulic motor which drives an electrical generator. Electricity having an alternating current is generated and is supplied as needed to various consumers including both homes and commercial utility companies. Excess electrical energy is supplied to an AC electrical motor which in turn drives a hydraulic pump. The hydraulic pump pressurizes hydraulic fluid from the low pressure storage tank and supplies the pressurized hydraulic fluid to the high pressure storage tanks. In this way, excess electrical energy is conserved and is utilized to pressurize hydraulic fluid for later use in the production of electricity.

The high pressure storage tanks may be of various configurations with a compressible fluid such as air or nitrogen being compressed by the pressurized hydraulic fluid. If the storage tanks are arranged vertically, the tanks may be provided with a piston to separate the compressible fluid from the hydraulic fluid. If the storage tanks are to have a large capacity, for example, for the production of electricity on a commercial scale, it may be advantageous to arrange the storage tanks horizontally in an underground facility. In such a facility, the storage tanks would preferably be encased in high strength concrete.

BRIEF DESCRIPTION OF THE DRAWINGS

Particular embodiments of the present invention are described in accordance with the appended drawings wherein like members bear like reference numerals and wherein.

DETAILED DESCRIPTION OF THE PRESENT INVENTION

Figure 1:
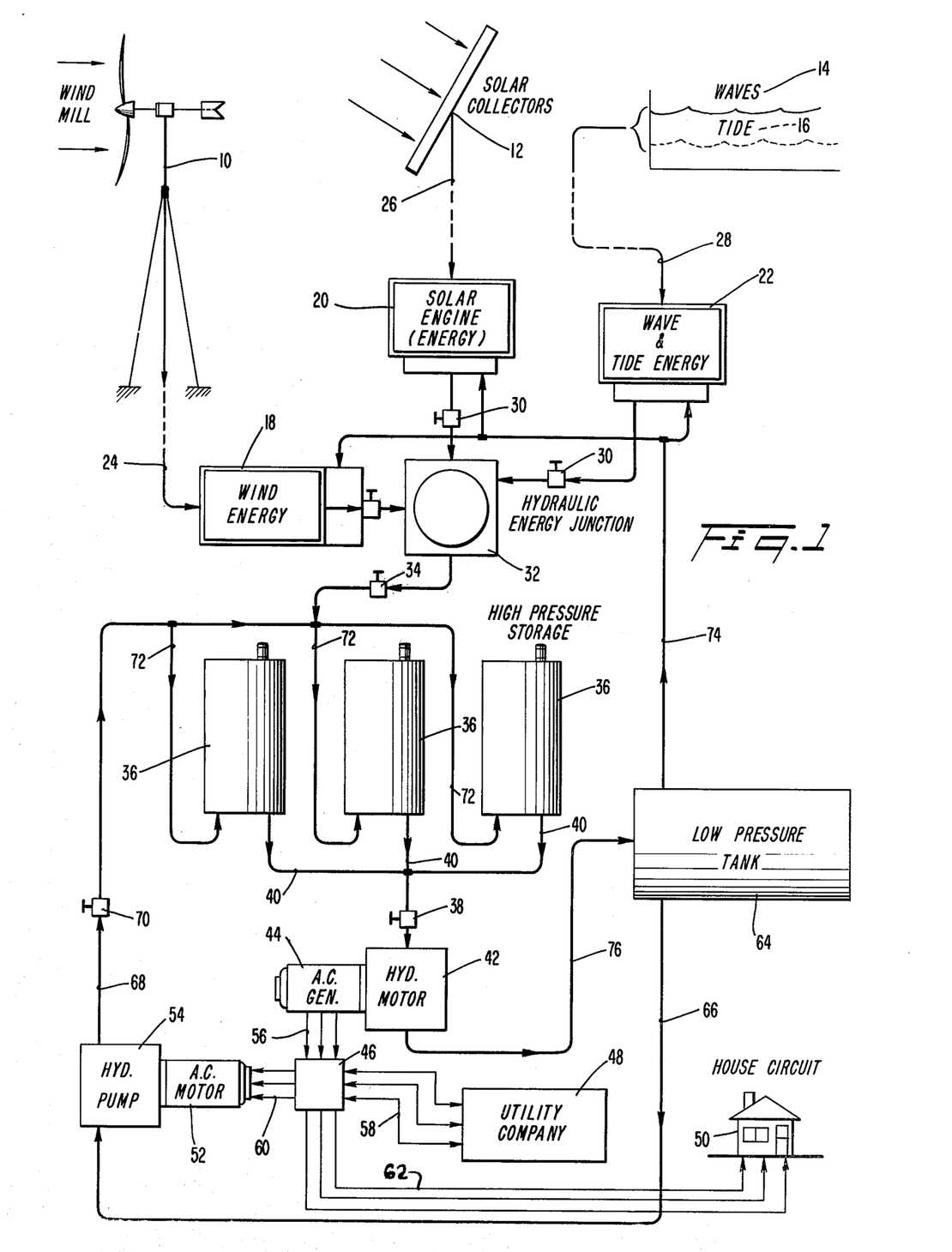
FIG. 1 is a schematic illustration of a natural energy conversion system according to the present invention.

With reference now to FIG. 1 of the drawings, a natural energy conversion system include a plurality of devices for utilizing natural energy. These devices may include but are not limited to a windmill 10, solar collectors 12, devices for utilizing wave energy 14 and tide energy 16. The windmill 10 typically converts the natural energy of the wind into mechanical energy which may be transferred as indicated by line 24 to a wind energy device 18. The wind energy device 18 typically comprises a pump for pressurizing hydraulic fluid and for supplying the hydraulic fluid to a hydraulic energy junction 32 by way of a check valve 30. The wind energy device 18 receives low pressure hydraulic fluid from a low pressure tank 64 by way of a conduit 74.

The solar collectors 12 may utilize the solar energy in various ways such as to produce steam. The energy produced by the solar collectors is transferred as indicated at line 26 to a solar engine device 20. Like the wind energy device 18, the solar energy engine 20 utilizes the energy of the solar collectors to pressurize hydraulic fluid which is supplied to the hydraulic energy junction 32. The solar energy engine 20 receives low pressure hydraulic fluid from the low pressure tank 64 by way of a conduit 74. The pressurized conduit fluid is supplied to the hydraulic energy junction by way of a check valve 30.

Various forms of natural water energy such as waves and tides are utilized by various wave energy conversion devices 14 and tide energy conversion devices 16 to produce usable energy. The usable energy produced by the natural water energy devices is transferred as indicated at line 28 to a wave and tide energy device 22. Low pressure hydraulic fluid supplied by the tank 64 through the conduit 74 is pressurized by the wave and tide energy device 22 and is supplied to the hydraulic energy junction by way of a check valve 30.

Various other natural energy conversion devices (not illustrated) may be utilized in a manner similar to that disclosed for natural wind, solar, and water energy in conjunction with a respective pumping device for the pressurization of hydraulic fluid. Hydraulic fluid pressurized in this way would then be supplied to the hydraulic energy junction 32 through an appropriate conduit by way of a check valve.

The hydraulic energy junction 32 schematically represents the common connection of the various pumping devices 18, 20, 22 with a plurality of high pressure storage tanks 36 by way of a check valve 34. The high pressure storage tanks 36 which will be discussed in more detail below, may be of various types but preferably include a compressible fluid which is compressed by the supply of pressurized hydraulic fluid. The particular capacity and number of high pressure storage tanks is readily determined from a consideration of the preferred electricity generating capacity of the natural energy conversion system.

Pressurized hydraulic fluid is withdrawn from the high pressure storage tanks 36 through a plurality of conduits 40 which are connected in parallel. The conduits 40 supply pressurized hydraulic fluid to a suitable hydraulic motor 42 by way of a check valve 38. The hydraulic motor 42 is of conventional design and is used to drive an alternating current electricity generator 44. The hydraulic motor 42 and AC generator 44 together comprise a hydro-electric generating device which utilizes pressurized hydraulic fluid for the generation of AC electricity.

The hydraulic motor and AC generator are of conventional design and are selected in order to produce the desired amount of electricity in order to satisfy demand.

It is preferable, however, that the AC generator generate electricity having an alternating current of 60 cycles per second (60 hertz) in order to be compatable with the vast majority of domestic appliances and motors. Accordingly, the hydraulic motor must produce a particular minimum amount of mechanical energy in order to drive the AC generator to produce electricity at 60 hertz. Furthermore, to produce AC electricity at 60 hertz, the AC generator must be continuously operated at a constant speed. Accordingly, the hydraulic motor must be driven at a constant speed so as to in turn drive AC generator at a constant speed.

Because the output of the AC generator can not be precisely adjusted so as to correspond precisely with the particular demand for electricity at any particular time, excess electrical energy is typically produced. It is necessary to produce excess electrical energy since the production of an insufficient amount of electricity would either result in blackouts or in the more common brownouts, wherein electricity of insufficient wattage or frequency is produced. Accordingly, the excess electricity at any particular moment must be constructively utilized. Otherwise, the excess electricity will be needlessly wasted since electricity is not readily stored except in storage devices such as batteries.

In the present invention, the excess electricity is directed by a relay 46 to an AC motor 52 through power lines 60. The AC motor 52 drives a hydraulic pump 54 so as to pressurize hydraulic fluid which is supplied by the low pressure tank 64 through the conduit 66. The hydraulic pump 54 supplies the pressurized hydraulic fluid through a conduit 68 and check valve 70 to the high pressure storage tanks 36 by way of the conduits 72. The electric motor 52 and hydraulic pump 54 together comprise an electro-hydraulic device for the utilization of electricity to pressurize hydraulic fluid.

The relay 46 is of conventional design and supplies sufficient electricity to various consumers such as homes 50 by way of power lines 62. Utility companies 48 may also be supplied with electricity by way of power lines 58. During periods of time when the production of electricity by the utility company 48 exceeds its demand for electricity, the utility company may supply excess electricity to the relay 46 for use in driving the AC motor 52.

The various check valves 30 prevent pressurized hydraulic fluid from reverse driving the various natural energy pumps 18, 20, 22 when the respective natural energy devices 10, 12, 14, and 16 are not being supplied with natural energy. In a similar manner, the check valve 34 prevents pressurized hydraulic fluid from flowing out of the high pressure storage tanks 36 into the hydraulic energy junction during those periods when none of the natural energy collection and utilization devices are being adequately supplied with natural energy.

The flow of pressurized hydraulic fluid from the high pressure storage tanks 36 to the hydraulic motor 42 is controlled by the check valve 38 which also serves as a pressure and flow regulating device. The valve 38 provides a constant flow of hydraulic fluid of a particular pressure to the hydraulic motor 32 so as to drive the AC generator continuously at a constant speed.

Finally, the check valve 70 prevents the pressurized hydraulic fluid within the high pressure storage tanks 36 from flowing in a reverse direction through the conduits 72 and 68 so as to reverse drive the hydraulic pump 54.

Figure 2:
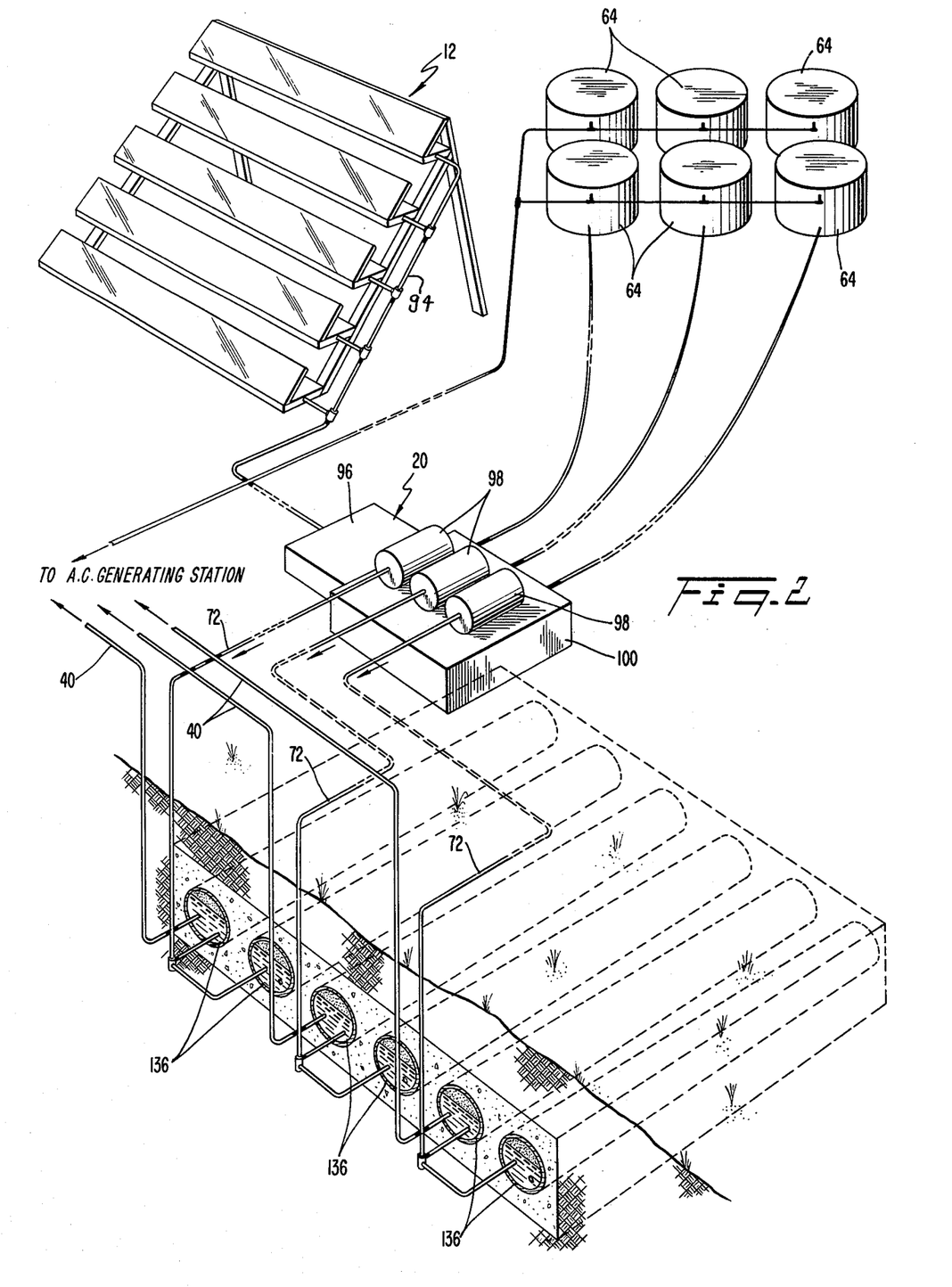
FIG. 2 is a schematic illustration of a portion of the system of FIG. 1 illustrating particular arrangements for the various storage facilities.

With reference now to FIG. 2 of the drawings, a natural energy conversion system according to the present invention for producing electricity on a commercial scale includes a plurality of high capacity low pressure storage tanks 64. The storage tanks 64 are arranged in series with one another and supply hydraulic fluid at atmospheric pressure to the solar energy engine device 20. The solar collectors 12 utilize solar energy to produce steam which is transferred along a conduit 94 to an engine station 96 of the solar energy engine 20. The engine stations 96 use the steam to drive various pumps 98 of a pumping station 100.

Hydraulic fluid which is pressurized by the pumps 98 is supplied to a plurality of high pressure storage tanks 136 through a series of conduits 72.

The high pressure storage tanks 136 include cylindrically shaped chambers which are encased in concrete. The plurality of tanks 136 are preferably arranged horizontally with a quantity of compressible fluid being compressed within each of the tanks by the supply of pressurized hydraulic fluid.

Figure 3:
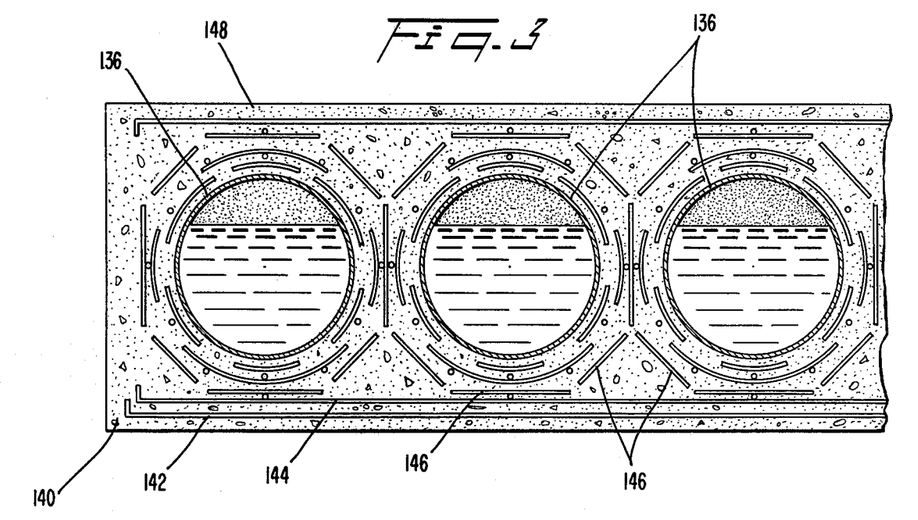
FIG. 3 is a cross sectional view of the high pressure storage facility of FIG. 2.

With reference also to FIG. 3, the pressurized tanks 136 may be encircled by various reinforcing members 146 which are provided within the concrete 140. Additional strength may be provided for the storage facility 148 by providing metal reinforcing screens or bars 144, 142 and 146 which extend both circumferentially around the steel tanks 136 and generally above and below the plurality of tanks. In this way, by using high strength concrete 140 along with high pressure steel tubes 136 and reinforced steel rods 142, 144, and 146, a large capacity and relatively safe storage facility for hydraulic fluid at high pressurization is possible.

Since the storage tanks 64 contain hydraulic fluid at atmospheric pressure, the storage tanks may be located above ground. It is preferable, however, that the high pressure storage tanks 136 for commercial size natural energy conversion systems be located underground and encased in high strength concrete for reasons of safety. The high pressure storage tanks 136 are preferably precharged with a compressible fluid at a pressure of approximately 1,000 psi. The pressurized hydraulic fluid supplied by the pumping station 100 is preferably at a pressure of between 3,000 and 4,000 psi and may be higher or lower for example, at 5,000 psi depending upon the characteristics and capacity of the particular system. If the storage tanks 136 are initially precharged to a pressure of 1,000 psi, the various check valves 30, 43, 38, and 70 are preferably adjusted to a pressure somewhat above the precharged pressure of 1,000 psi and may preferably be adjusted to a pressure of 1,200 psi.

The storage capacity of the high pressure storage tanks or hydraulic accumulators 36 is preferably sufficient so as to provide a storage capacity of at least approximately six hours so as to compensate for the variation in availability of natural wind, solar, and water energy.

The supply of hydraulic fluid in the low pressure tank 64 is preferably maintained at atmospheric pressure so as to achieve the greatest differential pressure that is conveniently possible across the hydraulic motor 42.

Figure 5A:
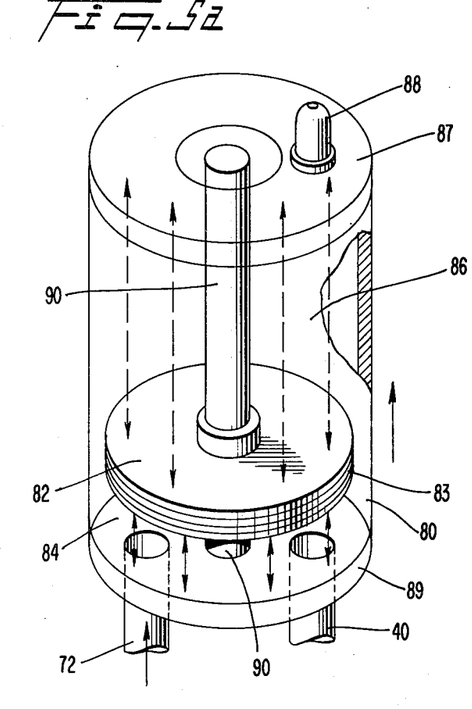
FIGS. 5a through 5d are pictorial illustrations of a high pressure storage tank having a piston member.

With reference now to FIG. 5a, a particular high pressure storage tank 80 may include a cylindrical chamber that is closed at both ends. The storage tank 80 is arranged vertically with an upper end cap 87 effectively closing the upper portion of the cylindrical chamber. A charging valve 88 is provided in the end cap 87 so as to permit a supply of compressible fluid such as air or nitrogen to be supplied to the storage tank. A central shaft 90 is provided axially within the storage tank 80 between the upper end cap 87 and a lower end cap 89. The lower end cap effectively seals a lower end of the chamber 80. An annular piston 82 having a high pressure seal 83 is provided around a periphery of the piston 82 and is slidably received on the shaft 90 for vertical movement within the storage tank 80. The conduits 72 and 40 supply and remove pressurized hydraulic fluid from a lower portion of the storage tank 80.

In this way, the piston 82 effectively separates the compressible gas from the hydraulic fluid within the tank 80. The pressurized hydraulic fluid is supplied to the tank through the conduit 72 and is removed as needed through the conduit 40 to be supplied to the hydraulic motor 42.

Figure 5B:
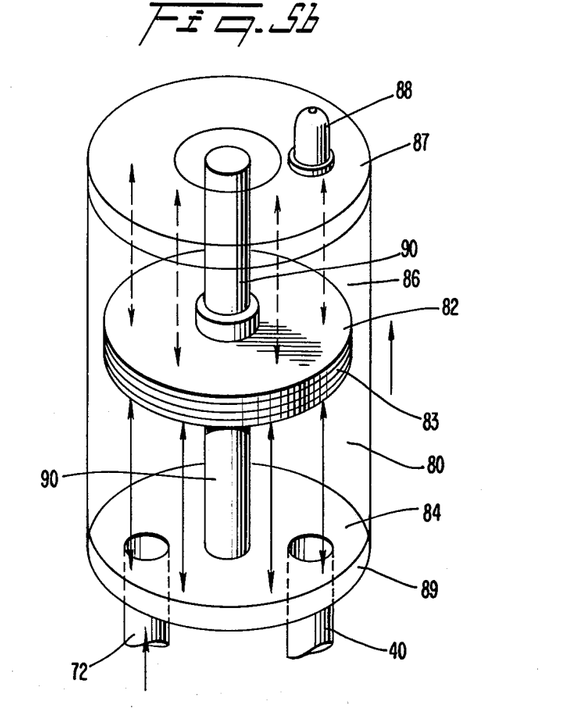

With reference now to FIG. 5b, when the supply of pressurized hydraulic fluid exceeds the removal from the supply tank 80, the quantity of pressurized gas above the piston is compressed. In this way, the piston 82 moves vertically upwardly in the tank 80.

Figure 5C:
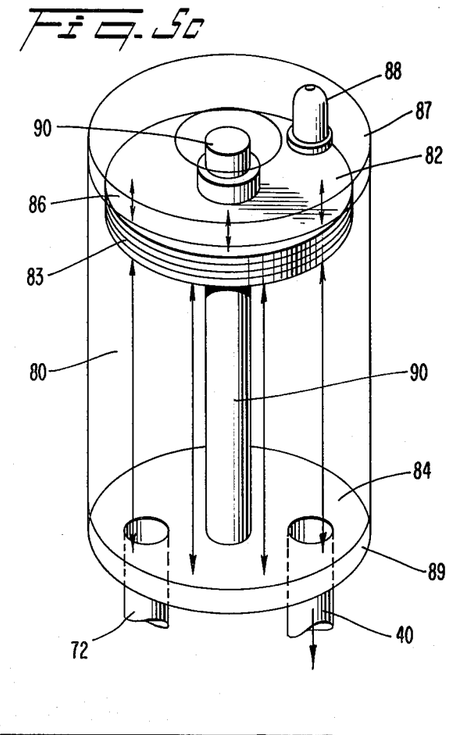

As the supply of hydraulic fluid within the tank 80 nearly fills the tank, the piston 82 approaches the upper end cap 87 of the tank 80. The storage tank 80 will be substantially filled with hydraulic fluid when the supply of natural energy to the various devices 18, 20, 22 exceeds the demand for electrical energy.

Figure 5D:
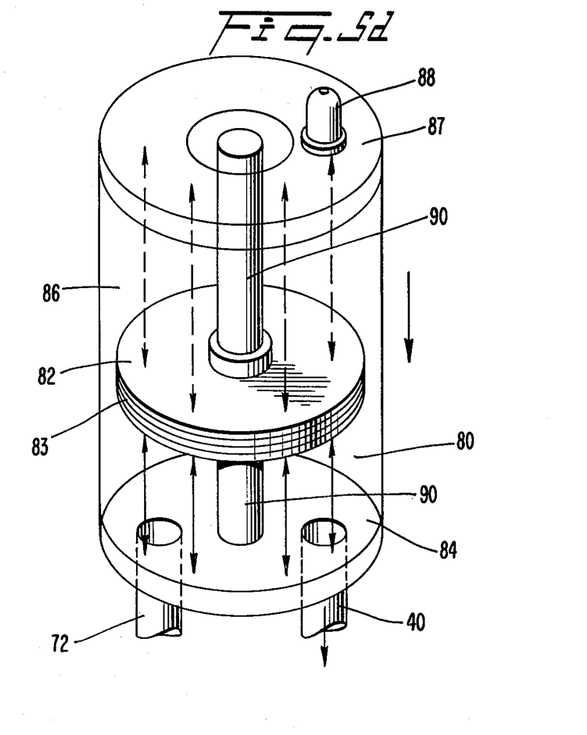

With reference now to FIG. 5d, the supply of hydraulic fluid to the storage tank 80 is no longer greater than the demand for hydraulic fluid by the hydraulic motor 42. Accordingly, the piston 82 moves downwardly with the compressed fluid or gas above the piston 82 expanding to drive the piston downwardly.

The shaft 90 of the storage tank 80 serves an additional purpose in that the structure of the storage tank 80 is strengthened by the shaft 90.

With reference to FIGS. 5a to 5d, a typical storage and power cycle of the storage chamber 80 is illustrated with an excess of fluid being supplied to the storage chamber 80 during the storage portion of the cycle as shown in FIGS. 5a and 5b. The maximum amount of hydraulic fluid is supplied to the storage chamber 80 in FIG. 5c with the power cycle commencing thereafter. During the power cycle, the supply of hydraulic fluid to the storage chamber is less than the rate at which the hydraulic fluid is removed, with the result that the piston 82 moves downwardly under the influence of the expanding compressible fluid above the piston 82.

Figure 6A:
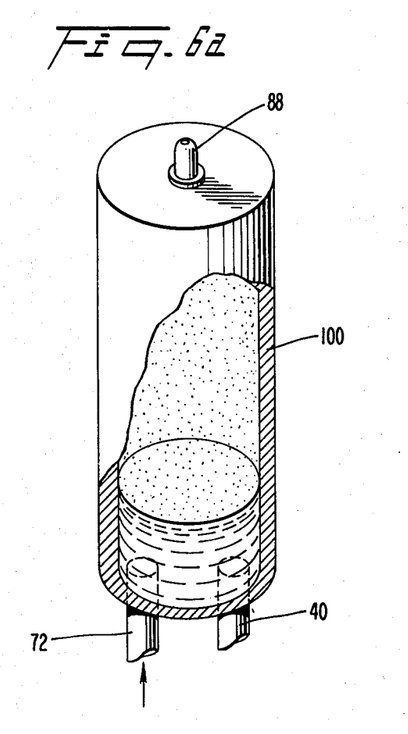
FIGS. 6a through 6d are pictorial illustrations of still another high pressure storage tank.

With reference now to FIG. 6a, a storage chamber 100 comprises a cylindrical chamber which is closed at both ends so as to provide a substantially sealed compartment. The cylindrical tank 100 is oriented vertically with hydraulic fluid being supplied to a lower portion of the tank 100 through the conduit 72. Hydraulic fluid is removed from the tank through the conduit 40 at the lower portion of the tank 100.

A compressible fluid or gas is supplied to the tank 100 through a precharge valve 88. The precharge valve 88 is preferably provided at an uppermost portion of cylindrical tank. Preferably a compressed gas such as air or nitrogen having a pressure of 1,000 psi is provided in the tank 100 before the pressurized hydraulic fluid is supplied to the tank. In the storage tank 100, a piston which separates the compressible fluid from the hydraulic fluid is unnecessary.

Figure 6B:
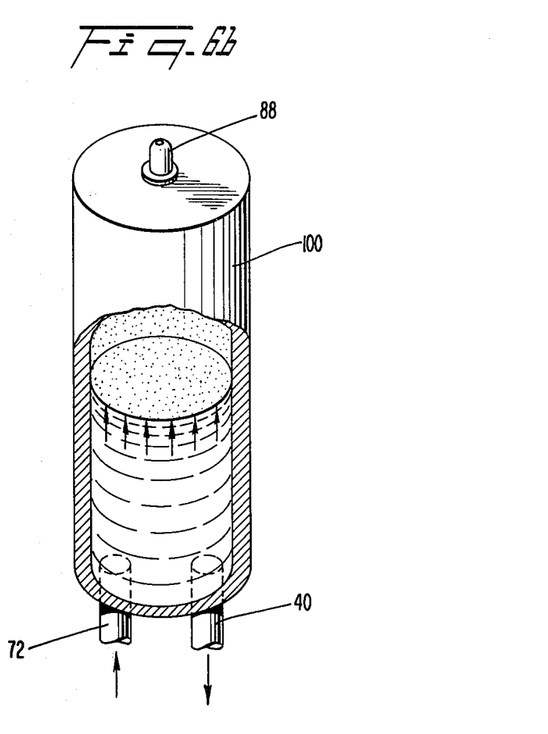

A storage and power cycle is illustrated with reference to FIGS. 6a through 6d with a quantity of hydraulic fluid being supplied to the storage tank 100 at a rate which is greater than the rate at which hydraulic fluid is being removed through the conduit 40. With reference now to FIG. 6b, the hydraulic fluid within the tank 100 compresses the compressible fluid above the hydraulic fluid with the level of hydraulic fluid rising in the tank.

Figure 6C:
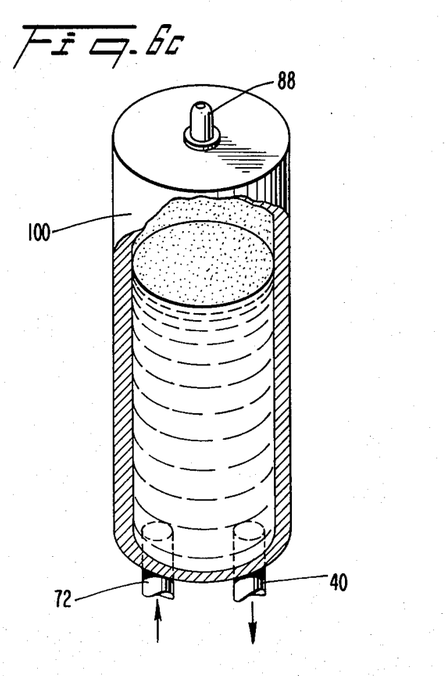
Figure 6D:
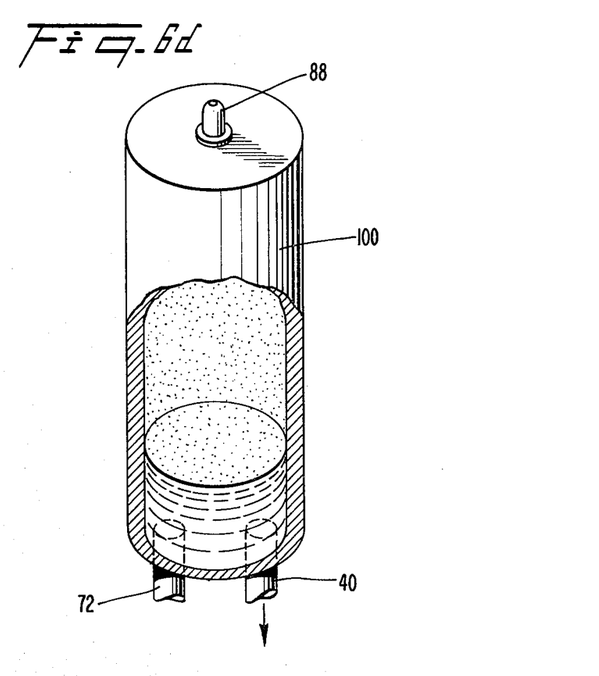

With reference to FIG. 6c the power cycle may begin when the lever of hydraulic fluid reaches a maximum level. During the power cycle, either no hydraulic fluid is being supplied to the tank (as illustrated in FIG. 6d) or alternatively, the hydraulic fluid is being removed from the tank at a rate which exceeds the rate at which hydraulic fluid is being supplied. In this way, the level of hydraulic fluid in the tank decreases, with the compressible gas expanding so as to drive the hydraulic fluid out of the tank through the conduit 40.

With reference again to FIG. 6a, the hydraulic fluid may be supplied to the tank 100 through the conduit 72 either simultaneously with the removal of hydraulic fluid or during the period of time when no hydraulic fluid is being removed from the tank.

Various selectively controlled valves may be provided for each of the high pressure storage tanks 36 so as to permit the individual tanks to undergo the various storage and power cycles described in connection with FIGS. 5a through 5d and 6a through 6d. Alternatively, all of the pressure storage tanks 36 may be connected in series so that all of the tanks are simultaneously supplied with hydraulic fluid. In this way, hydraulic fluid would be removed simultaneously through the conduit 40 from all of the storage tanks 36.

Figure 4:
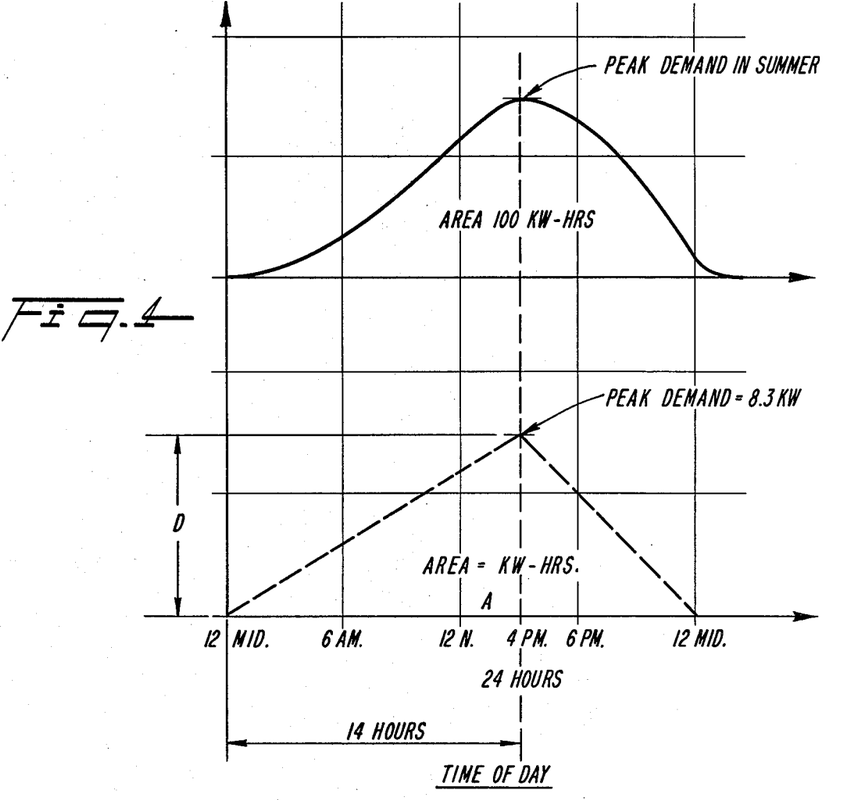
FIG. 4 is a graph of electrical energy demands versus time for a typical day.

With reference now to FIG. 4, a demand of electricity as a function of the time of day is provided. A typical demand of electricity during a summer day is described with the area under the curve representing the total kilowatt hours consumed per day per dwelling unit. As is evident from the graph, the peak demand for electricity consumption occurs approximately between 4:00 p.m. to 6:00 pm. at which time various devices such as air conditioners, stoves, showers, dishwashers, televisions and other devices are operating.

It has been calculated that an average household consumes approximately 3,000 kilowatt hours per month which is equivalent to approximately 100 kilowatt hours per day. Accordingly, the average household would have a peak demand as shown in the lower curve of 8.3 kilowatts at approximately 4:00 p.m. The peak demand of 8.3 kilowatts is approximately equivalent to 10 horsepower.

A particular hydraulic motor which is rated at 10 horsepower requires a flow rate of approximately 5 gallons per minute when operating at a speed of 2,500 r.p.m. Assuming that a energy conversion system has a six hour storage period, an 1,800 gallon storage tank would be required. If the storage period is only three hours, however, a 900 gallon storage tank per dwelling unit would be required. It is assumed, that the hydraulic fluid is to be maintained at a pressure of approximately 3,000 to 5,000 psi.

In this way, the storage capacity requirements of a natural energy conversion system may be calculated based on the number of dwelling units to be served by the system and by utilizing a statistical average peak demand required to serve the customers. Should the demand for additional electricity increase, a utility company may simply add additional high pressure storage tanks 36 in order to accomodate the increased storage requirement. It is understood that additional low pressure storage tanks 64 having an additional capacity sufficient to satisfy the demands of the high pressure storage tanks will be added.

In the present invention, pressure accumulators or high pressure storage tanks in which a compressible fluid is compressed are utilized so as to obtain particular advantages. These advantages include the ability to orient the storage tanks in various manners, for example, horizontally or vertically and to permit the use of storage tanks either with or without pistons depending upon particular considerations. A storage tank system which utilizes a weighted piston is particularly undesirable to supply pressurized fluid to a hydraulic motor for the production of commercial quantities of AC electricity since the weighted pistons would be extremely heavy and bulky and would additionally require the storage tanks to be oriented in the vertical direction. Similarly, the use of an elevated reservoir is particularly undesirable since such an arrangement is not readily feasible in many situations.

It has been calculated that a particular hydraulic motor must operate at a pressure of 3,000 pounds per square inch so as to produce a sufficient torque to drive an AC generator at a desired 3,600 r.p.m. speed for the production of 60 hertz electricity. These rates of pressure and speed for the hydraulic motor are conventionally determined and are applicable to a typical hydraulic motor such as those manufactured by the Borg-Warner Company and which are commercially available.

If such a hydraulic motor is to be driven at a rate of 3,600 rpms with an operating pressure for the hydraulic fluid of 3,000 pounds per square inch, and assuming a weighted piston hydraulic fluid storage tank having a diameter of four feet, a steel weight in excess of five million pounds would be necessary to provide the required 3,000 psi of hydraulic pressure. It has been calculated that such a weighted piston having a cylindrical shape with a four foot diameter would have a height of over 900 feet. Accordingly, a weighted piston would be completely unacceptable in order to produce a hydraulic pressure of 3,000 psi.

Assuming that an elevated reservoir is used to supply pressurized hydraulic fluid to a hydraulic motor operating at a pressure of 3,000 psi, the reservoir would necessarily be at an elevation in excess of 65,000 feet above the hydraulic motor. Assuming that the elevated reservoir were only 100 feet above the hydraulic motor, the resulting hydraulic pressure would be about 6,250 pounds per square foot or about 43 psi. Such a low pressure is insufficient to drive a conventional hydraulic motor in order to produce electricity for either commercial or domestic consumption. Because such low pressure results from the typical elevated reservoir, hydraulic turbines rather than hydraulic motors are driven by the hydraulic fluid. The hydraulic turbines utilize the energy resulting from the flow of large quantities of water to drive blades of the turbines and accordingly do not require relatively high pressures such as for example 3,000 psi.

With reference again to FIG. 1, it should be noted that the valve 38 may be adjusted so as to correspond broadly with the expected demand for electrical energy. The AC generator 44 typically must operate continuously and at a designated speed so as to achieve a constant frequency for the generated electricity.

In operation, natural energy is utilized by the various energy conversion devices such as windmills, solar collectors and water energy devices in order to drive various pumps 18, 20, and 22. The various pumps which receive hydraulic fluid from a relatively low pressure tank, pressurize the hydraulic fluid and supply the fluid to a hydraulic energy junction. The hydraulic fluid is now preferably at a pressure of about 3,000 to 5,000 psi. The high pressure hydraulic fluid is supplied from the hydraulic energy junction to a plurality of high pressure storage tanks 36. The storage tanks supply pressurized hydraulic fluid at a substantially constant rate and at a substantially constant pressure to a hydraulic motor 42 which drives an AC generator 44. The electricity produced by the generator 44 is utilized as needed by both domestic consumers and by utility companies. Excess electricity which is produced as a result of the inability to adjust the supply of hydraulic fluid to the hydraulic motor in accordance with consumer demand since the AC generator must operate at a particular speed in order to produce AC electricity is supplied to an AC motor 52. The excess electricity is used by the AC motor 52 to drive a hydraulic pump 54. In this way, the excess electrical energy is utilized to pressurize hydraulic fluid which is then stored in the high pressure storage tanks 36. The pressurized hydraulic fluid may then be used as needed in order to produce additional electricity.

The high pressure storage tanks 36 may be of various configurations depending upon the particular characteristics of the natural energy system. The high pressure storage tanks may be provided with or without a piston to separate the hydraulic fluid from a compressible fluid. The storage tanks may be arranged either horizontally or vertically if a piston is not necessary. Preferably, a plurality of high capacity storage tanks are arranged horizontally underground if the capacity of the natural energy conversion system is sufficiently large.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for converting natural energy into electrical energy comprising:
   natural energy conversion means for utilizing at least one source of natural energy to pressurize a hydraulic fluid;
   high pressure storage means for storing the hydraulic fluid pressurized by the natural energy conversion means;
   electro-hydraulic conversion means for utilizing electricity to pressurize hydraulic fluid;
   hydro-electric conversion means for utilizing pressurized hydraulic fluid to generate electricity;
   means for supplying excess electricity from the hydro-electric conversion means to the electro-hydraulic conversion means; and
   means for supplying pressurized hydraulic fluid from the electro-hydraulic conversion means to the high pressure storage means whereby the energy of the excess electricity generated by the hydro-electric conversion means may be substantially conserved for later use.

2. The apparatus of claim 1, wherein
   the natural energy conversion means utilizes a plurality of sources of natural energy.

3. The apparatus of claim 2, wherein
   the natural energy conversion means includes means for utilizing natural wind, solar, and water energy to pressurize the hydraulic fluid.

4. The apparatus of claim 2 wherein
   the hydro-electric conversion means provides electricity having an alternating current; and wherein the electro-hydraulic conversion means utilizes electricity having an alternating current.

5. The apparatus of claim 1, further comprising:
low pressure storage means for supplying hydraulic fluid to the electro-hydraulic conversion means and to the natural energy conversion means and for receiving hydraulic fluid from the hydro-electric conversion means.

6. The apparatus of claim 2, wherein
the high pressure storage means includes at least one tank having a quantity of a compressible fluid which is compressed by the pressurized hydraulic fluid.

7. The apparatus of claim 6, wherein the tank further comprises:
piston means for separating the compressible fluid from the pressurized hydraulic fluid.

8. The apparatus of claim 7 wherein
the tank is cylindrical, and
wherein the piston means includes a piston member which is axially slidable within the cylindrical tank.

9. The apparatus of claim 1, wherein
the high pressure storage means includes a plurality of cylindrical storage tanks arranged parallel to one another, the cylindrical tanks each having a quantity of a compressible fluid which is compressed by the pressurized hydraulic fluid.

10. The apparatus of claim 9, wherein
the plurality of cylindrical tanks are located underground with a longitudinal axis of each of the tanks being substantially horizontal.

11. A method for converting natural energy into electrical energy comprising the steps of:
utilizing at least one source of natural energy to pressurize a hydraulic fluid;
storing the pressurized hydraulic fluid in a storage tank;
utilizing the stored pressurized hydraulic fluid to generate electricity;
utilizing excess electricity to pressurize the hydraulic fluid; and
supplying the hydraulic fluid pressurized by utilizing the excess electricity to the storage tank whereby the excess electricity may be conserved for later use.

12. The method of claim 11, further comprising the step of:
utilizing a plurality of sources of natural energy to pressurize the hydraulic fluid.

13. The method of claim 11, further comprising the step of:
utilizing natural solar wind and water energy to pressurize the hydraulic fluid.

14. The method of claim 11, wherein
the hydraulic fluid is pressurized to a pressure of between 2,000 and 4,000 psi.

15. The method of claim 11, further comprising the step of:
initially pressurizing the storage tank by compressing a compressible fluid within the storage tank.

16. The method of claim 15 wherein
the storage tank is initially pressurized to a pressure of at least 1,000 psi.

17. The method of claim 11 wherein
the pressurized hydraulic fluid is utilized at a constant rate to generate electricity.

* * * * *